United States Patent [19]
Bhatia

[11] Patent Number: 5,552,513
[45] Date of Patent: Sep. 3, 1996

[54] ATOMOSPHERIC PRESSURE POLYESTER PROCESS

[75] Inventor: Kamlesh K. Bhatia, Newark, Del.

[73] Assignee: E. I. du Pont de Nemours and Company, Wilmington, Del.

[21] Appl. No.: 438,299

[22] Filed: May 10, 1995

Related U.S. Application Data

[63] Continuation-in-part of Ser. No. 138,312, Oct. 18, 1993, Pat. No. 5,434,239.

[51] Int. Cl.⁶ .................................................. C08G 63/00
[52] U.S. Cl. ........................ 528/308.3; 528/272; 528/274; 528/279; 528/283; 528/285; 528/302; 528/308; 528/308.6; 528/481; 528/489; 528/491; 528/492; 528/503
[58] Field of Search ........................... 528/272, 274, 528/279, 283, 285, 302, 308, 308.3, 308.6, 481, 489, 491, 492, 503

[56] References Cited

U.S. PATENT DOCUMENTS

| | | | |
|---|---|---|---|
| 2,578,660 | 12/1951 | Auspos et al. | 528/276 |
| 2,647,885 | 8/1953 | Billica | 528/285 |
| 2,789,972 | 4/1957 | Reynolds et al. | 528/370 |
| 2,973,341 | 2/1961 | Hippe et al. | 526/65 |
| 3,110,547 | 11/1963 | Emmert | 264/211.17 |
| 3,390,135 | 6/1968 | Seiner | 526/64 |
| 3,469,618 | 9/1969 | Siclari et al. | 159/48.2 |
| 3,545,520 | 12/1970 | Siclari et al. | 159/4.04 |
| 4,835,293 | 5/1989 | Bhatia | 549/274 |

Primary Examiner—Samuel A. Acquah

[57] ABSTRACT

An atmospheric pressure process for the continuous production of polyester is disclosed wherein a melt of dihydroxy ethyl terephthalate, or its low molecular oligomers, obtained by esterifying terephthalic acid or transesterifying dimethyl terephthalate with ethylene glycol, is intimately contacted with an inert gas to facilitate polymerization and removal of the reaction by-products. The ethylene glycol evolved and the inert gas are recycled.

39 Claims, 2 Drawing Sheets

ATOMOSPHERIC PRESSURE POLYESTER PROCESS

This is a continuation-in-part of U.S. Ser. No. 08/138,312, filed on Oct. 18, 1993, now U.S. Pat. No. 5,434,239.

FIELD OF THE INVENTION

An improved process for the production of polyester at atmospheric pressure is disclosed.

TECHNICAL BACKGROUND

Polyester production from terephthalic acid (TPA) or its esters, such as dimethyl terephthalate (DMT), and glycols is known. This has been accomplished by stage-wise melt polymerization of the dihydroxy ester of the bifunctional carboxylic acid, or low molecular weight oligomers thereof, under successively higher vacuum conditions. In order for the polymerization to continue to the degree needed for most commercial applications, the condensation by-products, especially ethylene glycol, must be removed from the reaction system at vacuums as high as 1–3 mm Hg. Such processes require costly high vacuum equipment, multistage steam jets to create the vacuum, and $N_2$ purged seals and flanges to minimize leakage of air into the system. Condensate from the steam jets and organic by-products from the system end up as a waste water stream that requires treatment and contributes to volatile organic emissions to the air. The present invention provides a less costly polymerization process that can be carried out at atmospheric pressure and in a closed loop configuration that eliminates volatile organic emissions and the waste water discharge.

Processes to conduct polymerization without employing vacuum and using an inert gas have been disclosed.

U.S. Pat. No. 2,973,341 (Hippe) discloses a continuous process for the production of polyester condensate and an improved continuous process for making polyethylene terephthalate from dimethyl terephthalate and ethylene glycol. The process employs liquid dimethyl terephthalate and mixes with it ethylene glycol, in an excess molar ratio of 1.5:1, to form a liquid reaction mixture in a first stage below the transesterification temperature and then carrying the liquid reaction mixture through three separate temperature controlled stages. Transesterification occurs in the second stage at a temperature of not more than 197° C.; vaporous reaction products are removed in the third stage at 197° C. to 230° C. by passing an inert gas through the liquid reaction mixture; polycondensation occurs in the fourth stage at 230° C. to 255° C. for a period of time sufficient to produce a filament forming polyethylene terephthalate condensate while again passing an inert gas through the liquid reaction mixture. Ethylene glycol by-product can be recovered from the fourth stage and recycled to the second stage of the reaction.

U.S. Pat. No. 3,545,520 (Siclari et al.) discloses an apparatus for stripping substances and lightweight fractions from polymers including a means for introducing an inert gas counter current to the polymeric material with the consequent increase in viscosity of the polymers. The apparatus permits recycling a portion of the material removed from the vessel so that the material can be recycled into the reaction container.

U.S. Pat. No. 3,469,618 (Siclari et al.) discloses a method for stripping off volatile fractions from polyamides and polyesters involving feeding material in the form of droplets or liquid threads though an inert gaseous atmosphere, while recirculating that atmosphere.

U.S. Pat. No. 3,110,547 (Emmert) discloses a process for preparing a linear condensation polyester. In one embodiment of the invention, the polymer is extruded downwardly through a chamber while passing a current of inert gas, such as nitrogen, through the reaction vessel at a rate sufficient to keep the glycol partial pressure below 2 mm Hg while maintaining a temperature between 300° C. and 400° C. in order to rapidly finish the polymer by converting the polymer having a degree of polymerization of from about 15 to 35 to a finished polymer with a degree of polymerization of about 70.

U.S. Pat. No. 3,390,135 (Seiner) discloses a continuous polyesterification process by direct esterification of dicarboxylic acids and polyhydric alcohols, and contacting the reaction product with a nonreactive gas to remove the water of esterification.

U.S. Pat No. 3,480,587 (Porter) discloses a polyester preparation process in which a lower molecular weight prepolymer is polymerized by conducting polycondensation in narrow tubes under conditions of turbannular flow achieved with an inert gas medium flowing cocurrently at high velocities.

French A,239,649 (Bayer) discloses a continuous process for preparing polybutylene terephthalate wherein monoesters or low viscosity polybutylene terephthalate is polymerized by cocurrently transporting it with a heated inert gas in the form of two phase annular flow through a long, narrow, helical tube of 3 to 100 nm (0.1 to 3.9 inch) diameter in which the inert gas flows in a velocity of 20–300 m/s (equal to 66 to 984 ft/second).

European Patent A,0182,351 (Mitsubishi) discloses a polyester process in which the ester or its oligomer is polymerized in the form of fine, 0.015 to 0.5 mm particles sprayed into an inert gas stream.

U.S. Pat. No. 5,064,935 (Jackson et al.) discloses a continuous process for preparing polybutylene terephthalate oligomer or prepolymer for feeding into a conventional polycondensation for PBT polymer. The prepolymer is prepared by feeding the reaction mass from a prior transesterification step into the top of a countercurrent column reactor through which a heated inert gas is passed upward by introducing it at the bottom.

The processes disclosed above, however, suffer from one or more drawbacks such as (1) only a low molecular weight oligomer or a prepolymer is produced; (2) the quantity of inert gas used is very large to be economical; (3) the reactor size might be too large to be feasible for commercial scale operation; (4) the inert gas employed is not recycled in a closed loop to eliminate emissions; (5) a prepolymer of sufficiently high molecular weight is required to achieve high molecular weight polyester required for commercial application; (6) inert gas velocities employed are too high to be feasible for commercial scale production or a high pressure is required. Because of such drawbacks, the processes presently practiced for commercial production of polyester continue to be conducted under high vacuum as described above.

The object of the present invention is to provide a further improved atmospheric pressure process for continuous or batchwise production of polyesters, particularly polyethylene terephthalate, of high molecular weight.

SUMMARY OF THE INVENTION

The invention relates to an atmospheric pressure method of polymerizing a dihydroxy ester of a bifunctional carboxylic acid, or of a low molecular weight polymerizable oligomer thereof, to a product with a high degree of polymerization (DP), preferably in the presence of a polyester polymerization catalyst, wherein by-products of the polymerization are removed from the system by means of an inert gas. This higher degree of polymerization is useful in fibers and films.

This process provides an improved method for producing linear aromatic polyesters, especially polyethylene terephthalate (PET), also referred to as polyethylene glycol terephthalate. The bifunctional acid in the production of PET is terephthalic acid (TPA). The process involves the production of polyethylene terephthalate from terephthalic acid and ethylene glycol (EG) by esterification, or from dimethyl terephthalate (DMT) and ethylene glycol by a transesterification stage, followed by polycondensation. The process is conducted at atmospheric pressure or above, thereby avoiding high vacuum equipment and eliminating possible air contamination that causes product decomposition and gel formation. The process comprises the following steps:

(a) esterifying terephthalic acid or transesterifying dimethyl terephthalate with ethylene glycol to produce dihydroxy ethyl terephthalate or its low molecular oligomers, and (b) intimately contacting the dihydroxy ethyl terephthalate or its low molecular weight oligomers in melt form with an inert gas flowing at a velocity of 0.2 to 3 ft/sec, such that the interfacial area between the melt and the gas phase is at least about 20 ft2/ft3 of the melt, and removing the volatile reaction by-products with the inert gas wherein the polymerization is complete in less than about 5 hours, preferably less than 3 hours, of contact time while the reactants are kept at a suitable temperature to maintain them in the melt form so as to produce polyethylene terephthalate.

The above processes are preferably conducted in the presence of a polyester polymerization catalyst. However, a catalyst is not needed for the esterification step (a) if the starting material is terephthalic acid.

In a preferred embodiment of the invention, a single stream of inert gas is recycled through a polymer finishing stage, a polycondensation stage and a stage wherein ethylene glycol is recovered for reuse in the process.

DETAILED DESCRIPTION OF THE INVENTION

Figure 1:
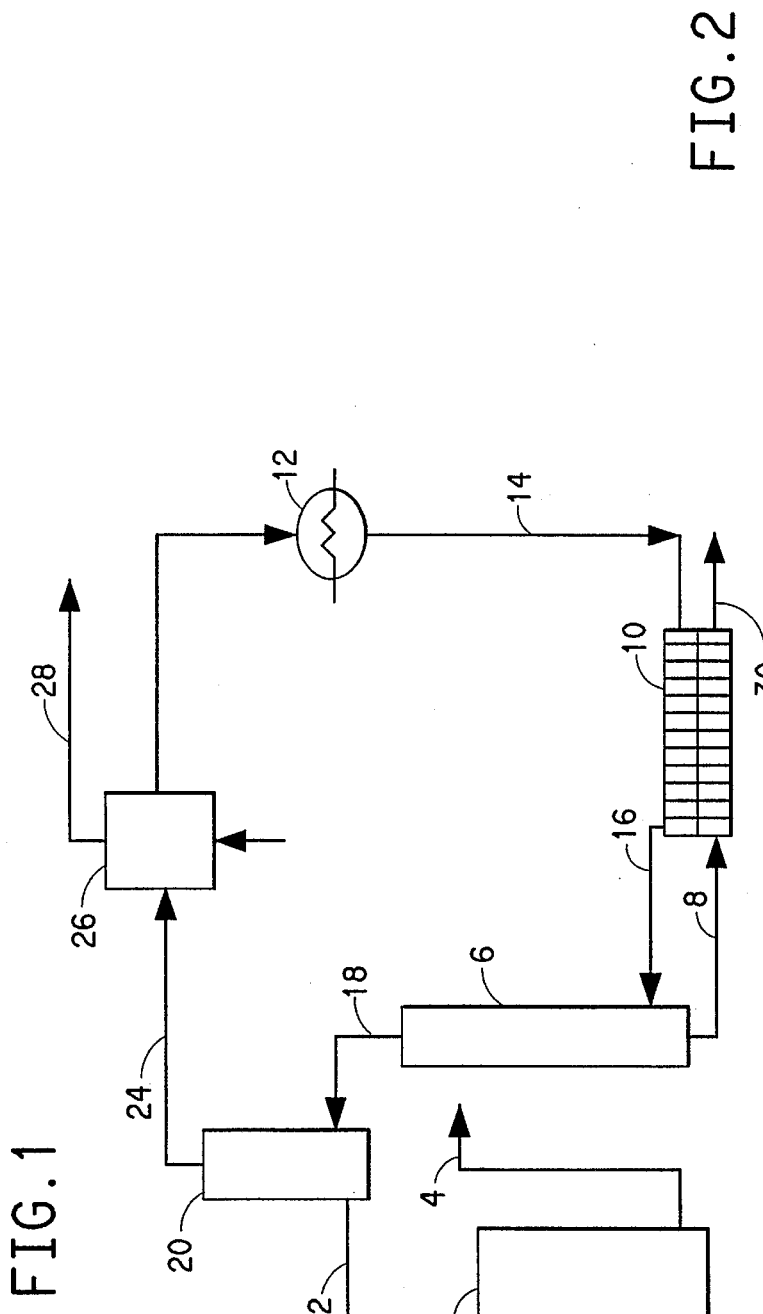
FIG. 1 is a diagrammatic flow sheet for one continuous process of the invention.

The polymerization step can be carried out in one vessel or more than one physically distinct vessel in series, wherein the reaction mass is polycondensed to some degree of polymerization in one vessel and then transferred to another vessel for further polymerization. This choice is based on mechanical considerations related to handling of the polymeric melt as its viscosity increases sharply as the degree of polyermization increases, heat input requirements to volatize the by-products of polycondensation and cost.

The above processes may be carried out batchwise or continuously. Batchwise production may be preferred for preparing specialty polymers when the production required is not very large and strict quality control is required particularly with respect to additives. For large scale production for commodity applications, such as staple and yarn, it is more cost effective to carry out the above steps continuously wherein the reactants are fed substantially continuously into the processing vessels and the products are removed substantially continuously. The rates of feed and product removal are coordinated to maintain a substantially steady quantity of the reactants in the reaction vessels while the inert gas flows countercurrently to the flow of the melt.

If two or more vessels are employed in series for conducting the polycondensation, it is preferred that a single stream of inert gas is employed that flows countercurrently to the flow of the melt in the process, i.e., the inert gas leaving a final stage of polymerization is led through the preceeding stage and finally through a stage wherein the ethylene glycol is recovered for reuse and the inert gas is recycled back to the final stage of polymerization.

Polyethylene terephthalate (PET) is manufactured in this process by first reacting terephthalic acid (TPA) or dimethyl terephthalate (DMT) with ethylene glycol (EG). If DMT is the starting material, a suitable transesterification catalyst such as zinc or manganese acetate is used for the reaction. Esterified DMT/TPA is polymerized as a melt at atmospheric pressure or above by intimately contacting the melt with a stream of inert gas (for example, but not limited to, $N_2$ or $CO_2$) to remove the condensation by-products, mainly, ethylene glycol. Preferably, the inert gas is preheated to about polymerization temperature or above, prior to its introduction into the polymerization equipment. It is preferred that the inert gas velocity through the polymerization equipment be in the range of 0.2 to 3 ft/sec, most preferably 0.3 to 1.5 ft/sec. The vapor leaving the polymerization (containing the ethylene glycol removed) is treated to recover the ethylene glycol for recycle to the esterification stage or for other uses. The inert gas stream is then cleaned up and recycled. Thus, the overall process operates as a closed loop system which avoids environmental pollution and integrates ethylene glycol purification and its recycle into the process.

The quantity of inert gas flow should be sufficient to carry the ethylene glycol to be removed at a partial pressure of ethylene glycol below the equilibrium partial pressure of ethylene glycol with the reaction mass at the operating temperature. The operating temperature during polycondensation is maintained sufficiently high so as to keep the reaction mass in a molten state. Preferably the temperature range is about 270° C. to 300° C.. The polymerization equipment is designed so that the interfacial area between the melt and the inert gas is at least 20 square feet, preferably at least about 30 square feet, per cubic foot of the melt and that this surface area is renewed frequently. Under these process conditions, the high degree of polymerization useful for fibers and films can be achieved in less than 5 hours of residence time, and preferably in less than 3 hours of residence time.

To produce good quality product of the desired high degree of polymerization, the polymerization should be completed in a reasonably short period such as less than 5 hours, preferably less than about 3 hours. The polymerization is considered completed when the degree of polymerization (DP) desired for a particular application is achieved. For most common applications, such as fibers, the DP should be at least 50, preferably at least 60, and most preferably at least 70. By "degree of polymerization" is meant the number average degree of polymerization. Exposure of the polymeric melt to high operating temperatures for prolonged period causes chain cleavage and decomposition reactions with the result that the product is discolored and a high degree of polymerization is not achieved. If the inert gas velocities are too low, polymerization takes longer. If the velocity is too high it can lead to entrainment of the reaction mass in the gas. In a continuous mode of operating, high inert gas velocities in a countercurrent direction can also hinder the flow of the melt through the equipment. Also, higher velocities may require larger quantities of gas flow without substantially increasing the effectiveness of polymerization. It has been found that the polymerization can be carried out effectively at 0.2 to 3 ft/sec velocities.

The quantity of inert gas flow employed to remove the ethylene glycol that evolves is sufficiently high so that the partial pressure of ethylene glycol in the gas, at any point in the process, is well below the equilibrium partial pressure of ethylene glycol with the melt at this point. Larger quantities of gas flow generally increase the rate of polymerization but the increase is not proportionately greater. Therefore, very large amounts of gas are not usually necessary or desirable as large quantities increase the size of recycling equipment and the cost. Very large quantities may also require larger size polymerization equipment in order to keep the gas velocity in the 0.2 to 3 ft/sec range.

In the continuous embodiment of this invention, wherein the inert gas flows countercurrently to the flow of the molten reaction mass, effective polymerization rates can be achieved with about 0.3–0.45 pounds of $N_2$ per pound of the melt (equivalent to about 2 to 3 moles of inert gas per mole of the polymer repeat unit) as long as the inert gas velocity is at least 0.2 ft/sec, preferably at least about 0.3 ft/sec. The $N_2$ flow, however, should be at least 0.2 lbs/lb of polymer (equivalent to 1.5 moles of inert gas per mole of polymer repeat unit). Larger quantities of gas flow may however be needed to obtain the preferred gas velocities.

In the process of this invention, the reactant is kept in a molten state, i.e., above its melting point which is about 260°–265° C.. At temperatures much above 300° C., decomposition reactions cause product discoloration which interferes with the quality of the product. The reaction mass should preferably be maintained at about 270° C. to about 300° C..

For the polycondensation to continue, ethylene glycol generated must be removed from the reaction mass by the inert gas. This removal is facilitated if there is a high interfacial area between the melt and the gas phase. To complete the polymerization in a reasonably short period, the surface area should be at least about 20 $ft^2/ft^3$ of the melt, preferably at least about 30 $ft^2/ft^3$ of the melt. A higher surface area is preferred to increase the rate of polymerization. The reaction equipment for contacting the melt and the inert gas should also be designed to frequently renew the interfacial area and mix the polymer melt. This is particularly important as the degree of polymerization increases and the melt becomes very viscous.

The rate of polymerization can be increased by using a suitable polymerization catalyst, particularly where a high interfacial area is provided for inert gas-melt contact. The increase in the overall rate, however, is not proportional to the concentration of catalyst as the removal of ethylene glycol starts to limit the overall polymerization.

The catalyst also increases the rates of decomposition reactions. An effective concentration of catalyst for a set of reaction conditions, such as temperature, gas flow, velocity and surface area, is such that it gives the most enhancement in the rate of polymerization without substantial decomposition. The optimum concentration of catalysts of various species can be determined by experimentation. It would generally be in the range of a few parts per million parts of the polymer, such as about 5–300 parts per million.

Catalysts for facilitating the polymerization are any one or more polyester polymerization catalysts known in the prior art to catalyze such polymerization processes, such as, but not limited to, compounds of antimony, germanium and titanium. Antimony trioxide ($Sb_2O_3$) is an especially effective catalyst which may be introduced, for convenience, as a glycolate solution in ethylene glycol. Examples of such catalysts are found in U.S. Pat. Nos. 2,578,660, 2,647,885 and 2,789,772, which are incorporated herein by reference.

Dihydroxy esters of other bifunctional carboxylic acids may also be used in the processes described herein. These are monomeric compounds that can polymerize to a polymer. Examples of such compounds are bis(2-hydroxyethyl) terephthalate, bis(4-hydroxybutyl) terephthalate, bis(2-hydroxyethyl) naphthalenedioate, bis(2-hydroxyethyl) isophthalate, bis [2-(2-hydroxyethoxy) ethyl] terephthalate, bis [2-(2-hydroxyethoxy)ethyl] isophthalate, bis[(4-hydroxymethylcyclohexyl)-methyl] terephthalate, bis[(4-hydroxymethylcyclohexyl)-methyl] isophthalate, and a combination of bis(4-hydroxybutyl) terephthalate and their oligomers. Mixtures of these monomers and oligomers may also be used to produce copolymers.

By a "polymerizable oligomer" is meant any oligomeric material which can polymerize to a polyester. This oligomer may contain low molecular weight polyester, and varying amounts of monomer. For example, the reaction of dimethyl terephthalate or terephthalic acid with ethylene glycol, when carried out to remove methyl ester or carboxylic groups usually yields a mixture of bis(2-hydroxyethyl) terephthalate, low molecular weight polymers (oligomers) of bis(2-hydroxyethyl) terephthalate and oligomers of mono(2-hydroxyethyl) terephthalate (which contains carbonyl groups). This type of material is referred to herein as "polymerizable oligomer".

The process may also be used to produce other polyesters such as poly(ethylene terephthalate), poly(1,4-butylene terephthalate), poly(ethylene naphthalenedioate), poly(ethylene isophthalate), poly(3 -oxa-1,5-pentadiyl terephthalate), poly(3-oxa-1,5-pentadiyl isophthalate), poly[1,4-bis(oxymethyl)cyclohexyl terephthalate] and poly [1,4-bis(oxymethyl)cyclohexyl isophthalate]. Poly(ethylene terephthalate) is an especially important commercial product.

The process avoids high vacuum polymerization processes characteristic of the conventional art. Advantages of the process are a simpler flow pattern, lower operating costs and the avoidance of steam jets, hot wells and atmosphere emissions. The process also has environmental advantages due to the elimination of volatile organic emissions and waste water discharge. Furthermore, polymerization is conducted in an inert environment. Therefore, there is less decomposition and gel formation which results in better product quality. Ethylene glycol and inert gas (e.g., $N_2$ or $CO_2$) are recycled continuously. The process is described in FIGS. 1 and 2.

FIG. 1 is a diagrammatic flow sheet for the continuous process of the invention. Reactant materials TPA (or its dimethyl ester, DMT) and ethylene glycol are supplied continuously to an esterification column (2) for esterification (or transesterification) to DHET and its low DP oligomers.

The resulting esterified or transesterified product is an oligomer with a low degree of polymerization (DP). The resulting DP is from 1–3 if the starting material is DMT. If TPA is the starting material, the resulting oligomer usually has a higher DP, in the range of from about 3–9. The molten reaction product formed in the esterification column (2) is conducted through transfer line (4) to a prepolymerization column (6) for polycondensation. A suitable polyester polymerization catalyst, such as $Sb_2O_3$, may be added at this point. Additives, such as $TiO_2$, which is usually added to polyester as a delustrant for fibers, may also be added at this point. Other materials to optimize the polymerization rate are also introduced as this point. For example, if TPA is the starting material for esterification the oligomer from column 2 may contain too many carboxyl end groups; some ethylene glycol (could be a portion of the ethylene glycol recovered later in the process from the inert gas) may be added to balance the end groups to optimize the reaction rate and enable polymerization to the desired high degree. On the other hand, if DMT is the starting material for esterification, a small amount of TPA may be added to increase the overall rate of polymerization. The prepolymer, exiting the esterification column with a degree of polymerization from 15–30, is conducted through transfer line (8) to finisher (10) in order to finish the polymer by raising the degree of polymerization to about 50 to about 150, preferably about 60 to about 120 and more preferably about 70 to about 90. The finisher (10) is maintained at a temperature greater than about 260° C. but not too high to cause polymer decomposition. A temperature range of about 270° C. to 300° C. is preferred. The polymerization product is continuously removed from the finisher through line (30). An inert gas, preferably nitrogen, is heated in heater (12) at a temperature of from about 280° C. to 320° C. and is introduced through line (14) into the finisher to flow counter current to the direction of polymer flow in order to remove volatile reaction by-products, primarily ethylene glycol. The inert gas flows through the finisher (10) and then through line (16) to prepolymerization column (6) removing volatile reaction by-products, which are mainly ethylene glycol, in that reaction column. The hot inert gas stream containing organic vapors, which are mainly ethylene glycol with minor amounts of methanol, water, and some thermal decomposition products, exits the prepolymerization column through line (18) and enters the glycol recovery column (20) where glycol is recovered from the stream and refined without the need for additional external heat. The recovered glycol is recycled to the esterification column (2) through line (22). The inert gas stream containing the volatile organics, such as acetaldehyde, exits the glycol recovery column through line (24) and enters an adsorption bed (26), such as an activated carbon bed, wherein the organic volatiles are adsorbed producing a clean nitrogen stream which can be heated and returned to the finisher (10). Thus, the nitrogen is employed in a closed loop and all processing equipment is operated at atmospheric pressure (or above, as is necessary to ensure the flow of nitrogen through the equipment in the loop). The inert gas flowing in the polymerization equipment (6) and (10) has a velocity of between about 0.2 to 3 ft/sec, preferably 0.3 to 1.5 ft/sec. The quantity of inert gas introduced into the system is sufficient so that the partial pressure of the by-products is maintained below the equilibrium pressure of the by-products with the melt in order to provide for the continuous polymerization. The quantity of inert gas may be as small as about 0.2–0.5 pounds for each pound of polyethylene terephalate produced. The adsorption bed (26) can be purged to remove the adsorbed products. The adsorbed products are transferred by line (28) to a combustion device, such as a boiler, (not shown) where they are converted to carbon dioxide and water by combustion thus completing an environmentally clean, emissions free process.

An embodiment of the present invention that further simplifies the continuous process described above comprises completing the polycondensation of the esterification oligomer to the final polyester product of high degree of polymerization in one vessel. The oligomer formed in the esterification reaction (2) is conducted directly to the finishing polymerizer (10) thereby the prepolymerization column (6) is eliminated. The inert gas leaving (10) is then fed to the glycol recovery column (20), is processed as described above and recycled. This embodiment is particularly suitable for polymerizing oligomers of about 5 DP or higher such as those generally obtained when TPA is used as the starting material for esterification.

In another embodiment of the process of this invention, the fresh ethylene glycol that needs to be fed to the esterification stage is first utilized for contacting with the inert gas in the glycol recovery column (2) and is then taken to the esterification stage along with the additional glycol recovered from the inert gas. This embodiment recovers most of the heat from the hot inert gas that leaves polymerization thereby heat input into the esterifier is reduced. It also reduces external cooling of the inert gas in column (2). Ethylene glycol flow to the recovery column (2) and other conditions may be adjusted such that the glycol leaving the column is sufficiently hot so as to substantially glycolize any low molecular weight oligomers or entrained polymer that might enter the column (2) in small amounts with the inert gas leaving the polymerization equipment.

Alternatively, or in conjunction with the operation of column (2) as described, the inert gas may be contacted with sufficient quantities of cold ethylene glycol so that the inert gas leaving the glycol recovery step is cooled down to about the ambient temperature or colder. In this embodiment of the process, minor amounts of low boiling components such as methanol, water, or acetaldehyde from decomposition reactions, if any present in the inert gas, are also substantially removed with the cold ethylene glycol stream, and it is not necessary to have the adsorption bed (26).

Figure 2:
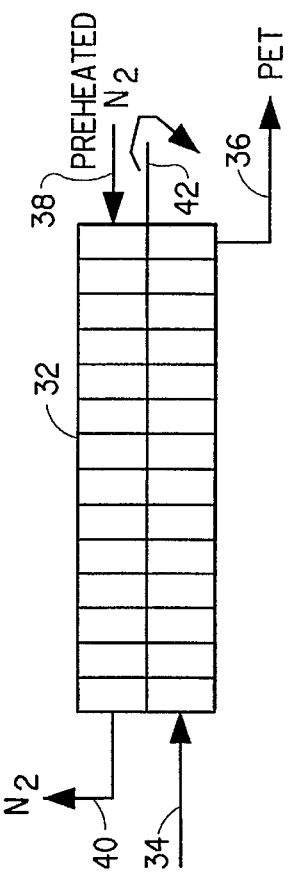
FIG. 2 represents one apparatus which is suitable for carrying out the polymerization of the invention, wherein material having a lower degree of polymerization is converted to material having a high degree of polymerization.

FIG. 2 illustrates one apparatus which is suitable for carrying out the polymerization of the invention particularly for use with the high viscosity material and degree of polymerization encountered in the finisher (10) of FIG. 1. It consists of a horizontal, agitated cylindrical vessel (32). The esterified DMT or TPA, or a low molecular weight oligomer thereof, is continuously introduced as stream (34) at one end of the vessel (32) and a preheated inert gas, such as nitrogen, is continuously introduced as stream (38) at the other end, so as to provide a counter current flow to the polymer flow. The nitrogen stream (38) carrying reaction by-product vapors, mostly ethylene glycol, leaves as stream (40). The polymerized product, polyethylene terephthalate, is removed as stream (36). The flow rates of streams (34) and (36) are coordinated to be equivalent to each other and controlled so as to provide the desired inventory of the melt in the finisher, usually about equivalent to 1 to 2 hours times the flow rate, which is equivalent to a melt level at about ⅓ to ½ the height of the vessel. The quantity of nitrogen introduced into the system is sufficient so that the partial pressure of the evolving reaction by-products is maintained at less than the equilibrium pressure of the by-products with the, for example, poly(ethylene) terephthalate (PET) melt, so as to provide adequate driving force to remove ethylene glycol from the melt into the gas stream. The diameter of the vessel is designed so that the superficial velocity of the inert gas stream is about 0.3 to 1.5 ft/sec.

The vessel is equipped with an agitator (42) which can be rotated at a controlled speed. The mechanical design of the agitator is such that (a) the walls of the vessel are wiped;
(b) a large interfacial area of at least 20 ft$^2$/ft$^3$ of the melt preferably greater then 30 ft$^2$/ft$^3$ of the melt is created;
(c) the surface area is renewed frequently; and
(d) good mixing is provided.

Figure 3:
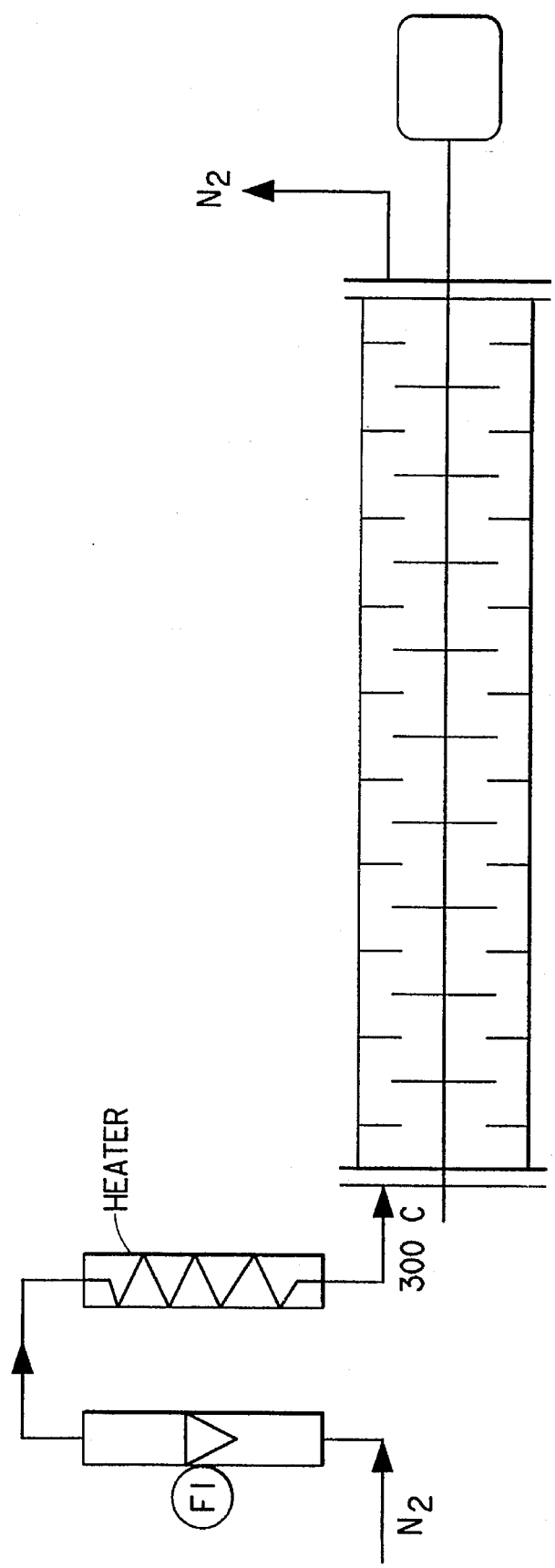
FIG. 3 represents a rotating disc and donut contactor for carrying out the polymerization of this invention.

One design which achieves the above specified criteria, is a rotating disc and donut contactor, shown in FIG. 3, comprising several alternating discs and donuts. The inert gas flows through the center of the donuts then flows radially towards the wall of the vessel in the space between the donut and the next disc, then around the disc towards the center of the next donut and so on. The discs and donuts are sized such that the velocity of gas through such passages does not exceed 5 ft/sec, and is preferably less than about 3 ft/sec. For a continuous polymerizer it is preferred that the discs and donuts are spaced closer near the end where the oligomer or the prepolymer is fed, the spacing is increased gradually or incrementally along the length of the cylinder so as to accommodate free downward flow of the reaction melt from the agitator elements as its viscosity increases. The spacing may be as close as ¼ inch near the feed end but preferably 1 inch or greater near the product discharge end where the viscosity of the melt is the highest.

The process of this invention may also be carried out for batchwise preparation of polyester wherein a batch of low molecular weight oligomer (either in a separate vessel or in the polymerizer) is charged to the polymerization equipment and contacted with the inert gas as described until the desired high degree of polymerization is achieved. The oligomer is prepared by esterification as described except that it may also be prepared batchwise either in a separate vessel or in the polymerization vessel itself. The gas and melt contacting equipment may be similar to that described for the continuous embodiment of this invention. For the final stages of polymerization, equipment similar to that of FIG. 3 may be used except that the discs and donuts are spaced uniformly. For batchwise preparation it is advantageous to adjust the speed of the agitator as the viscosity of the melt increases. Initially, when the viscosity is low, the agitator may operate at as high as 100 rpm but toward the completion of polymerization a low speed of about 1 to 20 rpm, preferably about 2–12 rpm is desirable. Batchwise production is suitable for economic reasons when relatively small quantities of polyester are to be prepared or when a strict control of additives concentrations is required for product quality considerations. When the quantities to be prepared are very small, it may be more economical to not provide equipment for recycling the inert gas, or the ethylene glycol, and discharge it to the atmosphere after rendering it harmless to the environment by known methods such as scrubbing it thoroughly with water and disposing off the water in an environmentally safe manner.

The invention can also be conducted in a semi-batch fashion wherein the polymerization equipment is fed intermittently, reaction mass is polymerized to a higher degree, and the product is discharged intermittently.

EXAMPLES 1–9

Examples 1–9 were conducted in a test tube heated to 280° to 295° C. by placing it in a temperature controlled sand bath. The test tube was equipped with means to introduce preheated $N_2$ at a controlled rate near the bottom and an outlet was created near the top of the test tube to allow $N_2$ to exit. Except for Example 9, 5 g samples of monomer, prepared at a DuPont commercial plant site by transesterifying DMT with EG, were placed in the test tube along with 180 to 1600 ppm of antimony, added as a $Sb_2O_3$ catalyst. The catalyst level was not found to affect the polymerization rate significantly and higher levels led to greyish discoloration of the product. Therefore, except for Examples 3, 5, and 6 which had catalyst levels of 1600, 400 and 900 ppm, respectively, all other Examples were at lower catalyst levels as shown in Table 1. In Example 9, a 10 g sample was employed and a Mn catalyst used for transesterification was rendered inactive by reacting with phosphoric acid, before adding the antimony catalyst. This also did not effect the kinetics measurably.

In Examples 8 and 9, the temperature was ramped from 230° C. to 285° C. over a 10 to 15 minute period. This allowed the initial polymerization to occur at lower temperatures and minimized volatilization of the low DP oligomers into the $N_2$ stream.

When the monomer melted in the tube, $N_2$ was introduced at a flow rate such that the superficial gas velocity was in the range expected for a commercial scale operation. The nitrogen velocities employed are shown in Table 1. For the examples where a range of velocities is shown, such as 0.2–0.6 ft/sec in Example 9, it means that the velocity was at the lower value at the start of the reaction and gradually increased to the higher value as the polymerization proceeded. $N_2$ was introduced below the melt causing the melt to lift up and allowing it to fall along the tube walls to create interfacial area (estimated at >30 ft$^2$/ft$^3$), and provide surface renewal and good mixing. Experiments were conducted for 12 to 105 minutes and the resulting PET product was analyzed for molecular weight distribution by GPC. The number average degree of polymerization calculated from GPC data for each sample are shown in Table 1. The values were independently confirmed by measurements of intrinsic viscosity.

TABLE 1

| EXAMPLE | POLYMERIZATION Time (Min.) | CATALYST ppm Sb | $N_2$ VELOCITY ft/sec | NO AVG. DP |
| --- | --- | --- | --- | --- |
| 1 | 12 | 225 | 0.3–0.6 | 24 |
| 2 | 21 | 180 | 0.3–1.0 | 44 |
| 3 | 21 | 1600 | 0.3 | 39 |
| 4 | 39 | 225 | 0.3–1.3 | 54 |
| 5 | 39 | 400 | 0.6 | 54 |
| 6 | 42 | 900 | 0.6 | 57 |
| 7 | 60 | 225 | 0.3–1.0 | 64 |
| 8 | 105 | 200 | 0.2–1.9 | 182 |
| 9 | 90 | 280 | 0.2–0.6 | 70 |

EXAMPLE 10

Polymerization of the same monomer used in Example 9 was studied on a microbalance apparatus in a stream of nitrogen in order to determine the impact of nitrogen velocity on mass transfer. A small sample, 63.6 mg, was suspended in a heated glass tube having a 25 mm inside diameter through which nitrogen flowed at a rate of 330 cc/min. Temperature of the sample was monitored by a thermocouple mounted close to the sample, while controlling the heat input to the glass tube. The progress of polymerization was monitored by observing the weight loss due to the evolution of reaction by-product, ethylene glycol.

The sample was heated to 288° C. and then held at that temperature for 90 minutes while maintaining the nitrogen flow rate. The velocity of nitrogen in the glass tube was calculated as 0.077 ft/sec. Due to the small size of the sample, there was a very large surface to volume ratio, estimated at over 180 ft$^2$/ft$^3$. In spite of such a large area (several times that of Examples 1–9) the rate of polymerization was slow due to the low nitrogen velocity. At the end of 90 minutes the polymer obtained and analyzed by GPC had a number average DP of only about 14. The need for adequate nitrogen velocity was confirmed by this experiment.

EXAMPLE 11

The same monomer used in Example 9 was polymerized in a laboratory apparatus of the type shown in FIG. 2 which was constructed to operate under the conditions disclosed in Example 14 for a commercial scale operation.

The apparatus consisted of a 6 inch glass tube with an inside diameter of 1 inch which was placed in a tube furnace equipped with temperature control. The tube was fitted with an agitator of ⅛ inch diameter coiled aluminum wire which provided mixing, surface renewal and wiping of the inside tube wall. The agitator was rotated by use of a motor having a variable speed gear reducer. It is estimated that the device provided a surface area of about 60 ft$^2$/ft$^3$ of the melt. The polymer melt temperature was monitored by means of a thermocouple inserted into the tube at each of its two ends.

The tube was filled with 37.6 g of monomer and placed in the furnace. The furnace temperature was raised to a sufficient temperature to melt the monomer. When the monomer was molten, the agitator was started and preheated nitrogen was flowed at a velocity of about 0.5 ft/sec through the tube. The temperature set point was then raised to 290° C. to effect polymerization. When the melt temperature inside the tube reached 290° C., the velocity of the nitrogen was raised to 1.1 ft/sec. Polymerization was continued for 90 minutes while controlling these operations under the above stated conditions. The actual temperature near the nitrogen outlet end varied from around 270° to 299° C.. The agitator speed was initiated at 15 RPM, but was reduced to 8 RPM after about 20 minutes and then further reduced to around 3–4 RPM after another 20 minutes as the melt became more viscous.

At the end of 90 minutes of polymerization, two samples of the resulting PET were analyzed by GPC. The number average DP was calculated to be 79 and 89, respectively, which are in the range required for most commercial applications.

To check the feasibility of higher nitrogen velocities, the velocity was raised to 1.45 ft/sec during the last 3 minutes of operation. No polymer carryover was observed. Just before shutting down, the velocity was increased to over 3 ft/sec and was found to be feasible.

EXAMPLE 12

This Example illustrates polymerization of a prepolymer obtained from esterification of TPA with ethylene glycol. This was prepared at a DuPont commercial plant site in the conventional process. It is equivalent to the material in line 8 of FIG. 1 which feeds the finisher (10). It had a number of average DP of about 20. Such material typically contains about 200 ppm Sb catalyst.

The apparatus in this Example consisted of a nominal 2" dia glass cylinder that was about 13.5 inches long (50 mm dia×34 cm). It was fitted with an agitator of the type described in FIG. 3 and was constructed to operate according to the process of this invention.

The agitator comprised 11 discs of 1½" dia and 11 donuts of slightly less than the cylinder dia and had holes in the center of ¾" in diameter. The discs and the donuts were arranged in an alternating donut-disc-donut fashion with a spacing of about ½" in between. These were held together with 4¼" wide wipers. The whole assembly could be freely rotated inside the tube with a variable speed motor. The wipers wiped the inside walls of the cylinder. It is estimated that the assembly provided about 68 ft$^2$ of surface area per ft$^3$ of the melt (including the surface of the cylinder and that of the melt) when about ½ full with the reaction mass. The cylinder was heated by placing it in a tube furnace as in Example 11. 360 gms of the solid prepolymer sample was ground and placed in the tube. The tube was slowly heated to melt the prepolymer. When the feed material was molten, the agitator was started and preheated nitrogen was flowed at a velocity of about 0.2 ft/sec based on empty cross-section of the cylinder. The actual contact velocity was, however, much higher as it flowed at a velocity of about 1.4 ft/sec through the donuts and 0.35 ft/sec around the discs. The furnace was set to maintain a temperature of about 290° C. around the cylinder. The actual temperature however varied between 276° and 293° C. on one thermocouple attached to the surface of the cylinder and between 293° and 303° C. on another thermocouple attached at some distance from the first. Thermocouples inserted inside the cylinder through the end plates measured a temperature of 265° C. on one end and 285° C. on the other end. Polymerization was continued at these temperatures with the agitator rotating at 50 rpm. After 20 minutes into the run the speed was reduced to 30 rpm and the nitrogen velocity (based on empty cross-section of the cylinder) was increased to 0.38 ft/sec. After 40 minutes under these conditions the melt was seen to have become quite viscous. The agitator speed was reduced to 4 rpm and polymerization continued for another 20 minutes.

The feed prepolymer was thus polymerized for a total of 80 minutes (1.33 hours). Two samples of polymer taken at the end of polymerization were analyzed by GPC. The number average DP for these was calculated to be 82 and 84 which is the range required for staple and yarn.

EXAMPLE 13

In this Example a low mecular weight obtained by esterifying TPA with ethylene glycol was polymerized without separately going through the prepolymerization step.

The oligomer was prepared in the same process unit as that in Example 12. This is equivalent to the esterification oligomer leaving the esterifier (2) of FIG. 1. It had a DP of about 9. This oligomer typically has about 600 me/kg concentration of carboxyl end groups and does not contain much catalyst. 500 gms of this oligomer was ground and heated to melt with 30 gms of ethylene glycol, under a N$_2$ blanket, to balance the carboxyl end groups concentration. Sb$_2$O$_3$ catalyst was premixed with the ethylene glycol. The molten oligomer thus prepared contained 300 ppm Sb$_2$O$_3$ and had a DP of about 5. 360 Gms of this oligomer was polymerized in an apparatus similar to that in Example 12 except that the agitator consisted of 4 wiper blades held together with 3 cross-shaped elements mounted on a center shaft. This assembly provided about 45 ft$^2$ surface area per cubic foot of the reaction melt (including the surface area of the cylinder and that of the melt pool).

The agitator was rotated at 60 rpm. The $N_2$ velocity based on the empty cross section was 0.79 ft/sec. The actual contact velocity on the average was twice as much since about ½ the cross section was occupied with the reaction mass. After 2 hours 15 minutes of polymerization the melt became so viscous that the agitator started to get deformed under the strain. The speed was reduced to 5 rpm and polymerization continued for another 15 minutes after which the apparatus was shut down and samples of product were taken for analysis. GPC analysis of two samples calculated to a number average DP of 99 and 101, exceeding the 75 to 84 DP generally needed for staple and yarn.

EXAMPLE 14

Example 14 illustrates the process of the invention for operating continuously a commercial scale of approximately 100 million pounds per year. Referring to FIG. 1, about 12,150 lbs/hr of prepolymer of approximately 20 DP are fed to finisher (10), maintained at between 285°–295° C., and contacted counter currently with a stream of nitrogen heated to about 300° C. and flowed at a rate of 1000 standard cubic feet per minute (SCFM). The flow rate is equivalent to 0.39 pounds of nitrogen per pound of PET produced. The finisher is 7 ft in diameter and 21 ft long. Polyethylene terephthalate, polymerized to a number average DP of 81, is withdrawn at a rate of 12,000 lbs/hr through line (30) while the level in the finisher is controlled such that the melt inventory in the finisher is equivalent to about 100 minutes or 1⅔ hours of PET throughput rate. The finisher (10) is equipped with an agitator to provide an interfacial area of about 50 square feet per cubic foot of the melt. It provides frequent surface renewal and good mixing of the melt. The superficial gas velocity of the nitrogen stream is 1.2 ft/sec under the actual operating conditions. The nitrogen stream leaving the finisher (10) through line (16) contains approximately 150 pounds of the ethylene glycol evolved in the finisher. The partial pressure of ethylene glycol in the stream is about 11 mm Hg.

The nitrogen stream leaving the finisher (10) through line (16) is then fed to the prepolymerizer (6) to provide counter current contact with the esterification product of about 1.5 average DP, produced by transesterification of DMT with ethylene glycol, entering the prepolymerizer (6) through line (4) at a rate of about 14,550 pounds/hour.

The prepolymerizer tower is 6 ft in diameter and 30 ft high. The interior of the tower is designed so as to provide intimate staged contact between the melt and the nitrogen vapor such that the hold up time of the melt in that column is about 20 minutes or ⅓ hour. The total time for polymerization, including the 1⅔ hours in the finisher is thus about 2 hours or less. The prepolymerizer is operated at 280° C.. A somewhat lower temperature may be maintained at the top of the tower to minimize volatilization of the lower molecular weight oligomers. The nitrogen velocity in the prepolymerizer is about 1 ft/sec near the bottom of the tower and about 1.4 ft/sec near the top of the tower.

The hot nitrogen vapors exit the prepolymerizer (6) through line (18) containing about 2550 pounds of ethylene glycol, along with small amounts of other components, such as very low DP oligomers, methanol from the end groups left unreacted during transesterification and minute quantities of high volatile organics, such as acetaldehyde, which may be present. The nitrogen stream is fed to the bottom of the ethylene glycol recovery column (20) through line (18). The column is 4 ft in diameter and the nitrogen velocity averages about 1.8 ft/sec. Heat is removed at the top of the column to cool the nitrogen to near the ambient temperature. Essentially all the ethylene glycol is condensed and leaves the bottom of the column through line (22) as a hot liquid stream of about 150° C.. It is recycled through line (22) to the esterification column (2).

The small amount of oligomers entrained with the nitrogen stream leaving the prepolymerizer (6) react with the large excess of glycol at the bottom of the EG recovery column, reverting back to the monomer and are recycled along with the glycol stream to the esterification column. The uncondensed organics, such as acetaldehyde leave the EG recovery column along with the nitrogen through line (24) and are fed to an adsorption bed (26) of activated carbon. Volatile organic vapors are absorbed on the bed thus cleaning up the nitrogen stream. The nitrogen stream is heated to about 300° C. and recycled to the finisher. The adsorption bed (26) is periodically purged, when it nears saturation, to remove adsorbed organics which are sent to the boiler house and converted to carbon dioxide and water. A small amount of nitrogen may be purged from the nitrogen loop, and replenished with an equivalent amount of fresh nitrogen to keep the levels of impurities in the loop low. Such a nitrogen purge may be used for the periodic purging of the adsorption bed.

What is claimed is:

1. A process for preparing polyethylene terephthalate (PET) of at least a degree of polymerization of 50, by polymerizing dihydroxy ethyl terephthalate, or low molecular weight oligomers thereof, with the evolution of ethylene glycol and other volatile reaction by-products, the process conducted at about atmospheric pressure or above, comprising intimately contacting the dihydroxy ethyl terephthalate or low molecular weight oligomers thereof in melt form with an inert gas flowing at a velocity of 0.2 to 3 ft/sec, wherein the interfacial area between the melt and the gas phase is at least about 20 $ft^2/ft^3$ of the melt, and removing the volatile reaction by-products with the inert gas, wherein the polymerization is completed in less than about 5 hours of contact time while the reactants are maintained in the melt form.

2. The process of claim 1 wherein the inert gas velocity is 0.3 to 1.5 ft/sec.

3. The process of claim 1 wherein the PET is produced continuously and wherein reactants are fed substantially continuously at one end of the polymerization equipment and product PET is removed substantially continuously at the other end, the feed and removal being coordinated to be equivalent and intimately contacting the reaction mass with the inert gas, flowing countercurrently to the flow of reaction mass.

4. The process of claim 1 wherein the process is conducted as a batch process and wherein the reactants are intimately contacted with the said inert gas at the said gas velocities until a desired degree of polymerization is achieved.

5. A process for the continuous production of high molecular weight PET, having a DP at least of fiber and film grade, from dimethyl terephthalate (DMT) and ethylene glycol, the process conducted at about atmospheric pressure or above comprising:

(a) transesterifying DMT with ethylene glycol to produce dihydroxy ethyl terephthalate (DHET) or low molecular weight oligomers thereof;

(b) intimately contacting DHET or low molecular weight oligomers thereof, in melt form with an inert gas flowing countercurrently to the flow of the reaction melt at a velocity of 0.2 to 3 ft/sec, wherein the contact area is at least about 20 ft$^2$/ft$^3$ of the melt, the ethylene glycol and other reaction by-products are continuously removed, and wherein the product PET is removed continuously while an amount of reaction mass equivalent to less than about 5 hours of the product throughput rate is maintained in melt form;

(c) recovering ethylene glycol, removed in step (b), from the inert gas, for recycle to step (a), and recycling the inert gas back to the system.

6. A continuous process for the continuous production of high molecular weight PET, having a DP at least of fiber and film grade, from terephthalic acid (TPA) and ethylene glycol, the process conducted at about atmospheric pressure or above comprising (a) esterifying TPA with ethylene glycol to produce dihydroxy ethyl terephthalate (DHET) or low molecular weight oligomers thereof;

(b) intimately contacting DHET or low molecular weight oligomers thereof, in melt form with an inert gas flowing countercurrently to the flow of the reaction melt at a velocity of 0.2 to 3 ft/sec, wherein the contact area is at least about 20 ft$^2$/ft$^3$ of the melt, the ethylene glycol and other reaction by-products are continuously removed, and wherein the product PET is continuously removed while an amount of reaction mass equivalent to less than about 5 hours of the product throughput rate is maintained in melt form;

(c) recovering ethylene glycol, removed in step (b), from the inert gas, for recycle to step (a), and recycling the inert gas back to the system.

7. The process of claim 1 wherein the polymerization is conducted in two or more vessels in series, wherein the reaction melt flows from one to the next vessel and a single stream of inert gas is employed which flows in the process countercurrently to the flow of the reaction melt.

8. The process of claim 5 wherein the polymerization is conducted in two or more vessels in series, wherein the reaction melt flows from one to the next vessel and a single stream of inert gas is employed which flows in the process countercurrently to the flow of the reaction melt.

9. The process of claim 6 wherein the polymerization is conducted in two or more vessels in series, wherein the reaction melt flows from one to the next vessel and a single stream of inert gas is employed which flows in the process countercurrently to the flow of the reaction melt.

10. The process of claim 3, wherein the feed is an oligomer of dihydroxy ethyl terephthalate of at least about 5 DP and polymerization to the final product DP is conducted by contacting the reaction melt with the inert gas in a single reaction vessel.

11. The process of claim 5 wherein the feed to step (b) is an oligomer of dihydroxy ethyl terephthalate of at least about 5 DP and polymerization to the final product DP is conducted by contacting the reaction melt with the inert gas in a single reaction vessel.

12. The process of claim 6 wherein the feed to step (b) is an oligomer of dihydroxy ethyl terephthalate of at least about 5 DP and polymerization to the final product DP is conducted by contacting the reaction melt with the inert gas in a single reaction vessel.

13. The process of claim 1 wherein the inert gas is selected from $N_2$ and $CO_2$.

14. The process of claim 3 wherein the flow rate of the inert gas is at least about 1.5 moles per mole of the PET repeat unit.

15. The processes of claim 5 wherein the flow rate of the inert gas is at least about 1.5 moles per mole of the PET repeat unit.

16. The processes of claim 6 wherein the flow rate of the inert gas is at least about 1.5 moles per mole of the PET repeat unit.

17. The process of claim 3 wherein the flow rate of inert gas is about 2 to 3 moles per mole of the polymer repeat unit.

18. The process of claim 5 wherein the flow rate of inert gas is about 2 to 3 moles per mole of the polymer repeat unit.

19. The process of claim 6 wherein the flow rate of inert gas is about 2 to 3 moles per mole of the polymer repeat unit.

20. The process of claim 1 wherein the polymerization is conducted in the presence of a polyester polymerization catalyst to enhance the reaction rate.

21. The process of claim 5 wherein the polymerization is conducted in the presence of a polyester polymerization catalyst to enhance the reaction rate.

22. The process of claim 6 wherein the polymerization is conducted in the presence of a polyester polymerization catalyst to enhance the reaction rate.

23. The process of claim 18 wherein the catalyst is selected from group consisting of antimony, germanium and titanium.

24. The process of claim 1 wherein the inert gas is preheated to about polymerization temperature or above polymerization temperature prior to contacting it with the melt.

25. The process of claim 5 wherein the inert gas is preheated to about polymerization temperature or above polymerization temperature prior to contacting it with the melt.

26. The process of claim 6 wherein the inert gas is preheated to about polymerization temperature or above polymerization temperature prior to contacting it with the melt.

27. The process of claim 1 wherein the volatile reaction by-products are recovered and the inert gas is continuously recycled for reuse in the process.

28. The process of claim 3 wherein the volatile reaction by-products are recovered and the inert gas is continuously recycled for reuse in the process.

29. The process of claim 1 wherein a single stream of inert gas is recycled through a polymer finishing stage, a polymerization stage and a stage wherein ethylene glycol is recovered for reuse in the process.

30. The process of claim 5 wherein a single stream of inert gas is recycled through a polymer finishing stage, a polymerization stage and a stage wherein ethylene glycol is recovered for reuse in the process.

31. The process of claim 6 wherein a single stream of inert gas is recycled through a polymer finishing stage, a polymerization stage and a stage wherein ethylene glycol is recovered for reuse in the process.

32. The process of claim 1 wherein the quantity of the inert gas introduced into the system maintains the partial pressure of the by-products below the equilibrium pressure of the by-products with the melt.

33. The process of claim 2 wherein the quantity of the inert gas introduced into the system maintains the partial pressure of the by-products below the equilibrium pressure of the by-products with the melt.

34. The process of claim 3 wherein the quantity of the inert gas introduced into the system maintains the partial pressure of the by-products below the equilibrium pressure of the by-products with the melt.

35. The process of claim 5 wherein the inert gas is selected from $N_2$ and $CO_2$.

36. The process of claim 6 wherein the inert gas is selected from $N_2$ and $CO_2$.

37. The process of claim 1 wherein the temperature is about 270 degrees C. to about 300 degrees C.

38. The process of claim 5 wherein the temperature of polymerization step (b) is about 270 degrees C. to about 300 degrees C.

39. The process of claim 6 wherein the temperature of polymerization step (b) is about 270 degrees C. to about 300 degrees C.

* * * * *